United States Patent
Klein et al.

(10) Patent No.: US 10,968,896 B2
(45) Date of Patent: Apr. 6, 2021

(54) CONNECTION AND FASTENING UNIT FOR A LIGHTNING RECEPTOR FOR INTEGRATION INTO A WIND TURBINE ROTOR BLADE

(71) Applicant: Nordex Energy SE & Co. KG, Hamburg (DE)

(72) Inventors: Hendrik Klein, Rostock (DE); Thomas Lipka, Rostock (DE)

(73) Assignee: Nordex Energy SE & Co. KG, Hamburg (DE)

(*) Notice: Subject to any disclaimer, the term of this patent is extended or adjusted under 35 U.S.C. 154(b) by 0 days.

(21) Appl. No.: 15/844,169

(22) Filed: Dec. 15, 2017

(65) Prior Publication Data
US 2018/0180031 A1    Jun. 28, 2018

(30) Foreign Application Priority Data
Dec. 22, 2016 (EP) .................................. 16206459

(51) Int. Cl.
| | | |
|---|---|---|
| *F03D 80/30* | (2016.01) | |
| *F03D 1/06* | (2006.01) | |
| *H02G 13/00* | (2006.01) | |

(52) U.S. Cl.
CPC ........... *F03D 80/30* (2016.05); *F03D 1/0675* (2013.01); *H02G 13/40* (2013.01); *H02G 13/80* (2013.01); *F05B 2230/60* (2013.01); *Y02E 10/72* (2013.01); *Y02P 70/50* (2015.11)

(58) Field of Classification Search
CPC ........ F03D 80/30; F03D 1/0675; F03D 80/00; F03D 1/0658; F05B 2230/60; H02G 13/00; H02G 13/40; H02G 13/80; Y02E 10/721; Y02P 70/523
USPC ...................................................... 416/223 R
See application file for complete search history.

(56) References Cited

U.S. PATENT DOCUMENTS

| | | | |
|---|---|---|---|
| 7,651,320 B2 | 1/2010 | Hansen | |
| 8,105,035 B2* | 1/2012 | Bertelsen | ............... H02G 13/00 29/889.7 |
| 8,133,031 B2 | 3/2012 | Arinaga et al. | |
| 8,182,227 B2 | 5/2012 | Jacobsen et al. | |
| 8,727,723 B2 | 5/2014 | Flemming et al. | |
| 10,199,816 B2* | 2/2019 | Ohlerich | ............... H02G 13/80 |
| 2009/0053062 A1 | 2/2009 | Arinaga et al. | |
| 2009/0196751 A1* | 8/2009 | Jacobsen | ............... F03D 1/0675 416/146 R |
| 2009/0257882 A1 | 10/2009 | Olsen | |

(Continued)

FOREIGN PATENT DOCUMENTS

| | | | |
|---|---|---|---|
| CN | 203430704 U | * | 2/2014 |
| EP | 2930356 A1 | | 10/2015 |

(Continued)

*Primary Examiner* — Courtney D Heinle
*Assistant Examiner* — Elton K Wong
(74) *Attorney, Agent, or Firm* — Walter Ottesen, P.A.

(57) ABSTRACT

A connection and fastening unit for components of a lightning protection system, the connection and fastening unit being realized for the purpose of being integrated in a wind turbine rotor blade and for being connected to the components of the lightning protection system, wherein the connection and fastening unit includes a cavity which can be closed in an airtight manner and in which a connector for connection to at least one of the components of the lightning protection system is arranged.

16 Claims, 4 Drawing Sheets

(56) References Cited

U.S. PATENT DOCUMENTS

| | | | |
|---|---|---|---|
| 2011/0182731 A1 | 7/2011 | Naka et al. | |
| 2015/0292487 A1* | 10/2015 | Ohlerich | H02G 13/80 |
| | | | 416/146 R |
| 2015/0377217 A1* | 12/2015 | Sandercock | F03D 80/30 |
| | | | 416/230 |
| 2016/0222945 A1* | 8/2016 | Shiraishi | F03D 80/30 |
| 2016/0245264 A1 | 8/2016 | Sogaard et al. | |
| 2016/0258423 A1 | 9/2016 | Whitehouse et al. | |
| 2016/0298608 A1* | 10/2016 | Whitehouse | F03D 1/0675 |
| 2017/0268481 A1 | 9/2017 | Enevoldsen et al. | |
| 2018/0030750 A1 | 2/2018 | Ollgaard | |
| 2018/0180032 A1 | 6/2018 | Klein et al. | |

FOREIGN PATENT DOCUMENTS

| | | | |
|---|---|---|---|
| EP | 2930358 A1 | 10/2015 | |
| WO | 2011080177 A1 | 7/2011 | |
| WO | 2014200333 A1 | 12/2014 | |
| WO | 2016165714 A1 | 10/2016 | |
| WO | WO-2018095660 A1 * | 5/2018 | F03D 80/30 |

\* cited by examiner

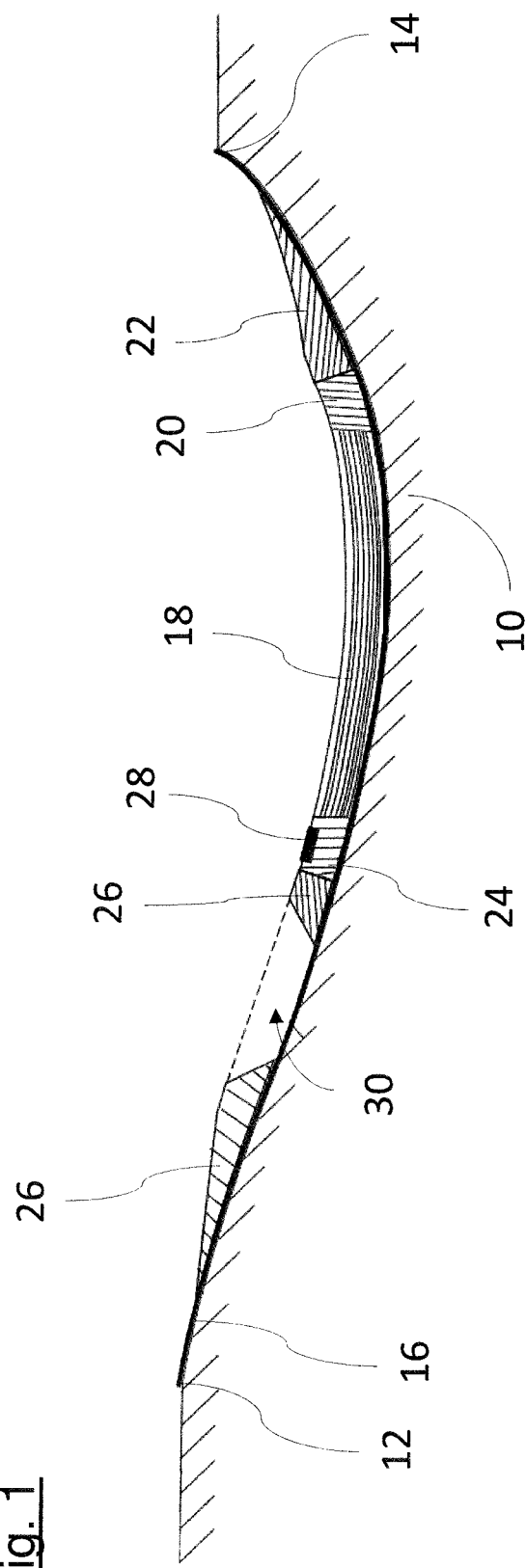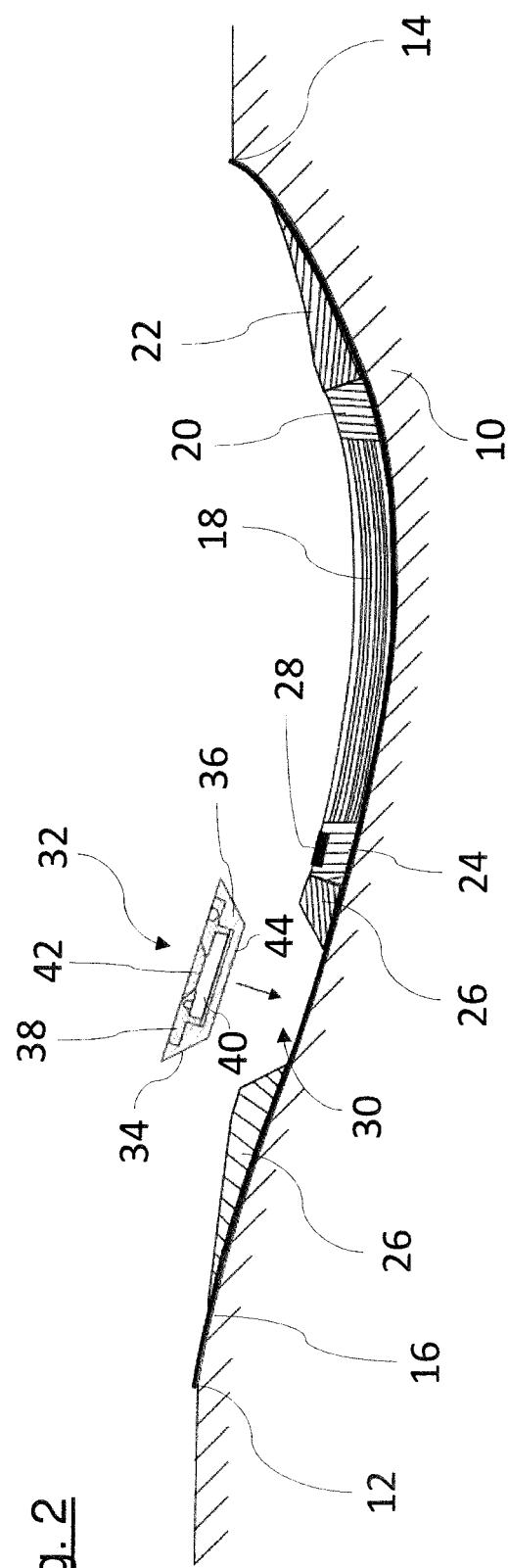

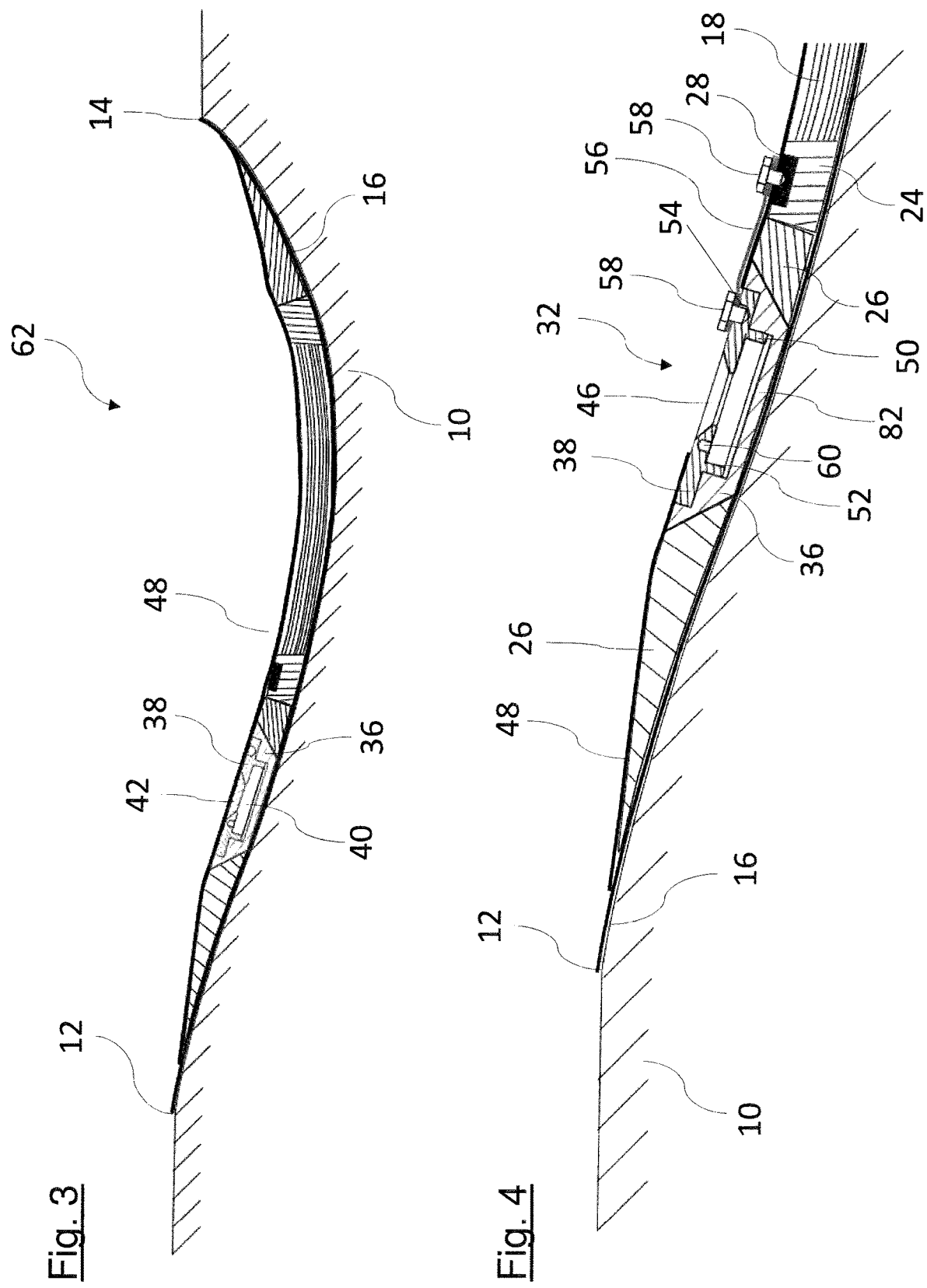

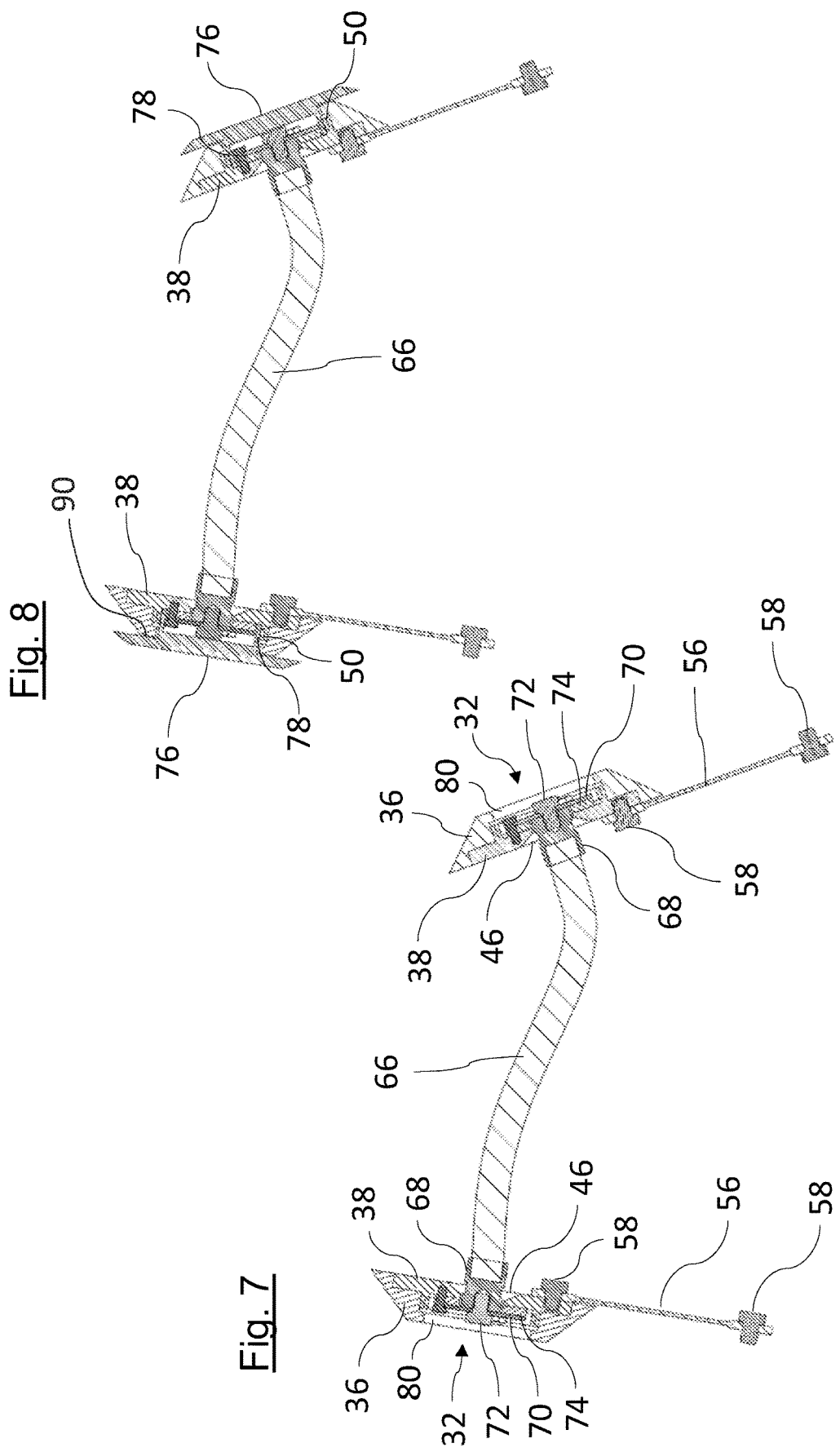

CONNECTION AND FASTENING UNIT FOR A LIGHTNING RECEPTOR FOR INTEGRATION INTO A WIND TURBINE ROTOR BLADE

CROSS REFERENCE TO RELATED APPLICATION

This application claims priority of European patent application no. 16 206 459.6, filed Dec. 22, 2016, the entire content of which is incorporated herein by reference.

FIELD OF THE INVENTION

The invention relates to a connection and fastening unit for components of a lightning protection system which is realized for the purpose of being integrated into a wind turbine rotor blade and for the purpose of being connected to the components of the lightning protection system.

BACKGROUND OF THE INVENTION

Such connection and fastening units are part of the lightning protection devices of known wind turbine rotor blades that serve for fastening and/or connecting some of the components of the lightning protection system. For example, a lightning receptor arranged on an outside surface of the wind turbine rotor blade may be fastened to the connection and fastening unit, and an electrical connection may be produced by way of the connection and fastening unit between the lightning receptor and a lightning protector conductor that is usually arranged in the interior of the wind turbine rotor blade. Occasionally, such connection and fastening units are also referred to as receptor bases. However, there are also other possible ways of fastening the lightning receptors and connecting them to a lightning protector conductor.

U.S. Pat. No. 7,651,320, for example, shows a wind turbine rotor blade with lightning receptors in the form of metal threaded bolts which are arranged in a rotor blade wall and are screw-connected to various connecting elements.

U.S. Pat. No. 8,133,031 discloses connection and fastening units in the form of solid metal plates which are embedded in a wind turbine rotor blade. Lightning receptors are screw-connected by threaded bores introduced subsequently into the metal plates.

US 2016/0245264 likewise discloses connection and fastening units which are embedded in wind turbine rotor blades and in the case of which lightning receptors are screwed into threaded bores that are subsequently introduced.

U.S. Pat. No. 8,182,227 discloses a wind turbine rotor blade with lightning receptors which are integrated directly into a wall of the rotor blade. In one embodiment, one of the lightning receptors includes a removable portion which closes an access opening to an interior of the rotor blade.

U.S. Pat. No. 8,727,723 discloses a lightning receptor for a wind turbine rotor blade. A connection and fastening unit into which the lightning receptor is screwed from the outside surface of the rotor blade is adhesively attached on an inside surface of a wall of the rotor blade.

WO 2014/200333 A1 discloses a device for fastening a lightning receptor on a wall of a wind turbine rotor blade. An inner and an outer fastening element are used for this purpose. The lightning receptor can either be fastened on the inner fastening element from the outside of the rotor blade, or together with the inner fastening element, on the outer fastening element from the inside of the rotor blade.

US 2015/0292487 discloses a connection and fastening unit for a lightning receptor which is adhesively attached to the inside surface of a rotor blade wall. Subsequently, a through bore is produced in the rotor blade wall and a lightning receptor is arranged at the intended position.

SUMMARY OF THE INVENTION

Proceeding from here, it is an object of the invention to provide a connection and fastening unit for components of a lightning protection system which can be easily integrated into a wind turbine rotor blade without significantly weakening the structural integrity of the rotor blade and which makes particularly simple fastening and/or connection of components of a lightning protection system possible, and also a corresponding method for mounting these components.

The object can, for example, be achieved by a connection and fastening unit for components of a lightning protection system. The connection and fastening unit is configured to be integrated in a wind turbine rotor blade and to be connected to the components of the lightning protection system. The connection and fastening unit includes: a connection and fastening body defining a cavity configured to be closeable in an airtight manner; at least one connector configured to connect to at least one of the components of the lightning protection system; and, the at least one connector being arranged in the cavity.

The object can, for example, also be achieved by a wind turbine rotor blade which includes: at least one component of a lightning protection system; a connection and fastening unit defining a cavity configured to be closable in an airtight manner; the connection and fastening unit including at least one connector connected to the at least one component of the lightning protection system; the at least one connector being arranged in the cavity; and, the connection and fastening unit being integrated into the wind turbine rotor blade.

The connection and fastening unit is intended for components of a lightning protection system and is realized for the purpose of being integrated into a wind turbine rotor blade. It includes a cavity which can be closed in an airtight manner and in which connecting means or a connector for connection to at least one of the components of the lightning protection system are arranged.

The connection and fastening unit is realized for the purpose of being integrated into a wind turbine rotor blade, that is in particular, of being embedded into a wall of the wind turbine rotor blade. In particular, it can be embedded into a plastics material matrix together with reinforcement fibers that are included in the wall, for example in a vacuum infusion process or another such process where the reinforcement fibers and the connection and fastening unit are embedded into an initially liquid, subsequently hardened plastics material.

The connectors produce an electrical connection with a sufficient current carrying capacity between the at least one component of the lightning protection system and the connection and fastening unit or a lightning protector conductor connected to the connection and fastening unit. The connectors are part of the connection and fastening unit and are already present prior to the integration of the connection and fastening unit into the wind turbine rotor blade. Consequently, once the connection and fastening units have been integrated into the rotor blade, they can be used immediately for connecting or fastening the components of the lightning protection system.

The connector is arranged in a cavity of the connection and fastening unit which can be closed in an airtight manner, so that they are neither damaged nor soiled when integrating the connection and fastening unit into a rotor blade. In particular, liquid plastics material is prevented from getting into the cavity, and consequently into the region of the connector. After the integration of the connection and fastening unit into the wind turbine rotor blade, in particular after the hardening of a liquid plastics material used for this, it is envisaged to open the cavity so far that the connector is accessible. After that, the at least one component of the lightning protection system can be connected to the connectors, in particular by a screw connection. This simplifies the mounting of the components of the lightning protection system and a positionally exact arrangement of the components is achieved.

The components of the lightning protection system are electrically conducting and contribute, when used correctly, to diverting a lightning current. They can include, for example, a lightning conductor, a lightning receptor, an equipotential bonding connection and/or another connection conductor. Connecting the connection and fastening unit to at least two of these components is provided, in particular, in order to produce an electrical connection between the components. In this case, at least one of the components is connected and/or fastened via the connectors that are arranged in the cavity.

Another advantage lies in the fact that the connection and fastening unit can be provided with suitable dimensions and sufficient dimensional stability in order to be able to be integrated into the wind turbine rotor blade in a particularly simple manner. In particular, when a wall of the wind turbine rotor blade is produced as a sandwich construction, it can replace or form parts of a core material, that is, can be arranged between two cover layers of the wall. Even when considerable forces act on the connection and fastening unit prior to and during the hardening of a liquid plastics material, for example when producing a vacuum, the connection and fastening unit maintains its form such that the production of the wall is not impaired.

In one configuration, the connection and fastening unit is realized such that, once the connection and fastening unit has been integrated into the wind turbine rotor blade, the cavity can be opened from an outside surface and/or an inside surface of the wind turbine rotor blade. Once the cavity has been opened, the connectors are accessible from the outside and/or the inside such that the components of the lightning protection system can be easily fastened and connected. In order to create the opening possibility, the connection and fastening unit can include, for example, a removable element such as a plug. It is also possible for the connection and fastening unit to include a wall which is provided for opening the cavity and for the opening to be carried out by removing the wall, for example, as a result of producing a bore through the wall, or by breaking out a portion of the wall that is provided for this purpose.

In one configuration, the connection and fastening unit includes a base body produced from an electrically insulating material and a connection body produced from an electrically conducting material, base body and connection body being fixedly connected together and the cavity being arranged between the base body and the connection body. The connector is realized on the connection body. The combination of base body and connection body enables a particularly simple production of the connection and fastening unit with the cavity. The realization of the base body from a non-electrically conducting material makes it possible for the connection body to be mounted in an electrically insulated manner. In addition, when suitable material is chosen, the base body can enter into a particularly deep connection with the wall of a wind turbine rotor blade. In particular, an outer circumferential surface of the connection and fastening unit can be formed by the base body for this purpose.

In one configuration, with the connection and fastening unit in an installation position in a wind turbine rotor blade, the base body faces an outside surface of the wind turbine rotor blade and the connection body faces an interior of the wind turbine rotor blade. Once the connection and fastening unit has been integrated into the wind turbine rotor blade, the connection body, as a result, is accessible in a particularly simple manner from the inside of the rotor blade, in particular to produce a connection to a lightning conductor. At the same time, the connection body can be electrically insulated from an outside surface of the wind turbine rotor blade via the base body such that direct lightning strikes in the connection body are countered.

In one configuration, the electrically insulating material is a fiber-reinforced composite. As a result, the connection and fastening unit can be embedded in an optimum manner into a wall of a wind turbine rotor blade. At the same time, the base body maintains a high degree of dimensional stability and can be processed using the same methods as further components of the wind turbine rotor blade, which, where applicable, are produced from the same or a similar material.

In one configuration, the connector includes a first connector which has an internal thread in the connection body, the internal thread being concealed by a wall of the base body which is at a distance from the connection body in the region of the internal thread. When viewed from the outside, the internal thread is situated behind the wall. The first connector is provided for the mounting of a lightning receptor. This can be screwed directly into the internal thread once the wall has been removed or opened, as a result of which an electrical and mechanical connection is produced at the same time between the lightning receptor and the connection body. When opening the cavity, the wall of the base body can be removed in full or in part. As it maintains a distance from the connection body in the region of the internal thread, the wall can be removed in a particularly simple manner without the internal thread being damaged. In addition, as a result of the distance, when the base body and the connection body are joined together (when producing the connection and fastening unit), portions of the wall are prevented from sticking to the connection body, which would later have to be removed. The distance from the internal thread or from the connection body can be maintained both in the axial and in the radial direction (in particular radially outward), in each case with reference to the internal thread.

In one configuration, the connection body includes a through opening which can be closed in an air-tight manner with a removable blind plug. The blind plug can close the cavity in the connection and fastening unit at the same time. Once the connection and fastening unit has been integrated into a wind turbine rotor blade, the blind plug can be removed in order to expose the through opening. On the one hand, a further access possibility to the cavity, in particular from an inside surface of the wind turbine rotor blade, is created as a result. On the other hand, it is possible to open the connection and fastening unit both from the outside and from the inside of the wind turbine rotor blade such that a through opening is provided through the entire connection and fastening unit and through a wall of the rotor blade into which the connection and fastening unit is integrated. As a result, the connection and fastening unit, in particular from an outside surface of the rotor blade, provides access to the interior thereof which is able to be utilized for various maintenance and installation work.

In one configuration, the connection and fastening unit is combined with a lightning receptor which is connectable to the first connector and includes an outer diameter which is greater than an outer diameter of the connection body. The matching of the dimensions of the lightning receptor to the connection body leads to the connection body being effectively shielded, as a result of which a lightning strike past the lightning receptor directly into the connection body is avoided. The lightning receptor is the at least one component of the lightning protection system which is connected to the connector in the cavity.

In one configuration, the connection and fastening unit includes a stop against which the lightning receptor abuts when it is connected to the connection body via the first connector. A large-surface contact, in particular with a contact area of 20 $mm^2$ or more, can be produced in particular in the region of the stop. This ensures, on the one hand, that the connection between lightning receptor and connection and fastening unit has a high current carrying capacity. On the other hand, the stop ensures that, when connected correctly to the connection body via the first connector, the lightning receptor is at a defined distance from the connection body or the connection and fastening unit. The stop can be arranged such that the lightning receptor closes off roughly flush with an outside surface of the wind turbine rotor blade when the connection and fastening unit is arranged in the installed position provided and the lightning receptor is correctly connected to the first connector.

In one configuration, the connectors include a second connector which is arranged in a surface of the connection body that points into the cavity and includes a bore with an internal thread. The second connector serves for the connection of an electric line. The electric line can be, for example, a lightning conductor or a connection conductor, which produces a connection between the connection and fastening unit and a lightning conductor (main conductor). As an alternative to this, the electric line can be an equipotential bonding connection between two connection and fastening units. In this case, each one of the two connection and fastening units can be integrated into one of the two half shells of the wind turbine rotor blade. The attachment of the electric line in this case takes place preferably by way of a perforated disk, which is connected to the electric line and is inserted into the connection and fastening unit. The fastening to the connection and fastening unit takes place via bolts on the second connector.

In one configuration, a third connector is provided which is arranged on a surface of the connection body that points into the interior of the wind turbine rotor blade and includes a bore with an internal thread. The third connector serves for the connection of a further electric line. It can be arranged outside the cavity that can be closed in an air-tight manner. The further electric line can realize, for example, an equipotential bonding connection between the connection and fastening unit and a lightning conductor that is embedded in the shell of the wind turbine rotor blade.

In one configuration, the connection and fastening unit is combined with a wind turbine rotor blade which includes components of a lightning protection system, the connection and fastening unit being integrated in the wind turbine rotor blade and the connector being connected to at least one of the components of the lightning protection system. The connection and fastening unit may include first, second and/or third connectors it being possible for the first connector to be connected to a lightning receptor and the second and third connector to be connected to electric lines. In particular, the connection and fastening unit may be integrated in a wall of the wind turbine rotor blade in a vacuum infusion process. For characteristics and advantages of this configuration, reference is made to the explanations given above.

The aforementioned object can, for example, likewise be achieved by a method for the mounting of components of a lightning protection system on a wind turbine rotor blade. The method includes the following steps:
  integrating a connection and fastening unit into a wind turbine rotor blade, the connection and fastening unit including a cavity which can be closed in an airtight manner and in which a connector for connection to at least one of the components of the lightning protection system is arranged,
  opening the cavity before connecting the connector to the at least one component of the lightning protection system, and
  connecting the connector to the at least one component of the lightning protection system.

The connection and fastening unit may be configured according to one or more of the configurations explained above. For explanation of the features of the method and of the connection and fastening unit, reference is made to the explanations given above. It is obvious that the connection and fastening unit may include first, second and/or third connectors, which are connected to components of the lightning protection system of the wind turbine rotor blade in further steps of the method.

Prior to connecting the connector to the at least one component of the lightning protection system, the cavity is opened, in particular from outside and/or inside the wind turbine rotor blade. As already explained, for this purpose for example a plug of the connection and fastening unit may be removed or an aperture may be created in a wall of the connection and fastening unit, for example by producing a bore or breaking out part of the wall.

In one configuration, the at least one component of the lightning protection system is a lightning receptor. The lightning receptor is connected to the connector arranged in the cavity.

In one configuration, the method includes the following further step: connecting a lightning protector conductor to the connection and fastening unit. As already explained, a third connector of the connection and fastening unit, which is arranged outside the cavity, may be used in particular for this.

In one configuration, the wind turbine rotor blade includes a wall of a sandwich construction into which the connection and fastening unit is integrated, the connection and fastening unit being arranged between a first cover layer and a second cover layer when producing the wall. In this respect, reference is made to the explanations given above. In particular, the connection and fastening unit may be laterally surrounded by a core material. For this purpose, in further steps of the method a corresponding clearance may be produced in a core material and the connection and fastening unit inserted into this clearance.

In one configuration, the wind turbine rotor blade includes two half shells, the connection and fastening unit being integrated into one of the half shells and the integration of the connection and fastening unit into one of the half shells taking place during the vacuum infusion process. The production of a connection between the connection and fastening unit and the lightning protector conductor that is likewise integrated in the half shell takes place prior to a joining together of the two half shells and the connection of the connector to the lightning receptor takes place thereafter. Therefore, first of all one of the two half shells may be finished, including the connection and fastening unit and the connection to the lightning protector conductor. These steps may be performed from an inside surface of the half shell. After the joining together of the two half shells, the lightning receptor is mounted, which includes connecting the connector to the lightning receptor and where applicable also the prior opening of the cavity in order to gain access to the connector arranged in the cavity.

In one configuration, a further connection and fastening unit, which includes a cavity which can be closed in an airtight manner and in which a connector for connection to at least one of the components of the lightning protection system is arranged, is integrated into the other of the two half shells. Already before the joining together of the two half shells, an electrical connection can be produced between the further connection and fastening unit and a further lightning protector conductor arranged in the other of the two half shells. After the joining together of the two half shells, an electric line is inserted into the wind turbine rotor blade and electrically connected to the two connection and fastening units. The production of an electrical connection between the two connection and fastening units that is accomplished after the joining together of the two half shells then brings about a reliable equipotential bonding connection between the two lightning protector conductors in a particularly simple manner.

BRIEF DESCRIPTION OF THE DRAWINGS

The invention will now be described with reference to the drawings wherein:

FIGS. 1 to 3 show the integration of a connection and fastening unit into a half shell of a wind turbine rotor blade, shown in each case in a schematic cross section at various points in time;

FIG. 4 shows an enlarged detail of the arrangement from FIG. 3 once further productions steps have been carried out;

FIG. 7 shows the connection and fastening units from FIG. 6 in addition to further elements of a lightning protection device once an equipotential bonding connection has been produced, also in a schematic cross-sectional representation, the remaining elements of the half shells not being shown; and, FIG. 8 shows the arrangement from FIG. 7 once second lightning receptors have been mounted, also in a schematic cross-sectional representation.

DESCRIPTION OF THE PREFERRED EMBODIMENTS OF THE INVENTION

Figure 5:
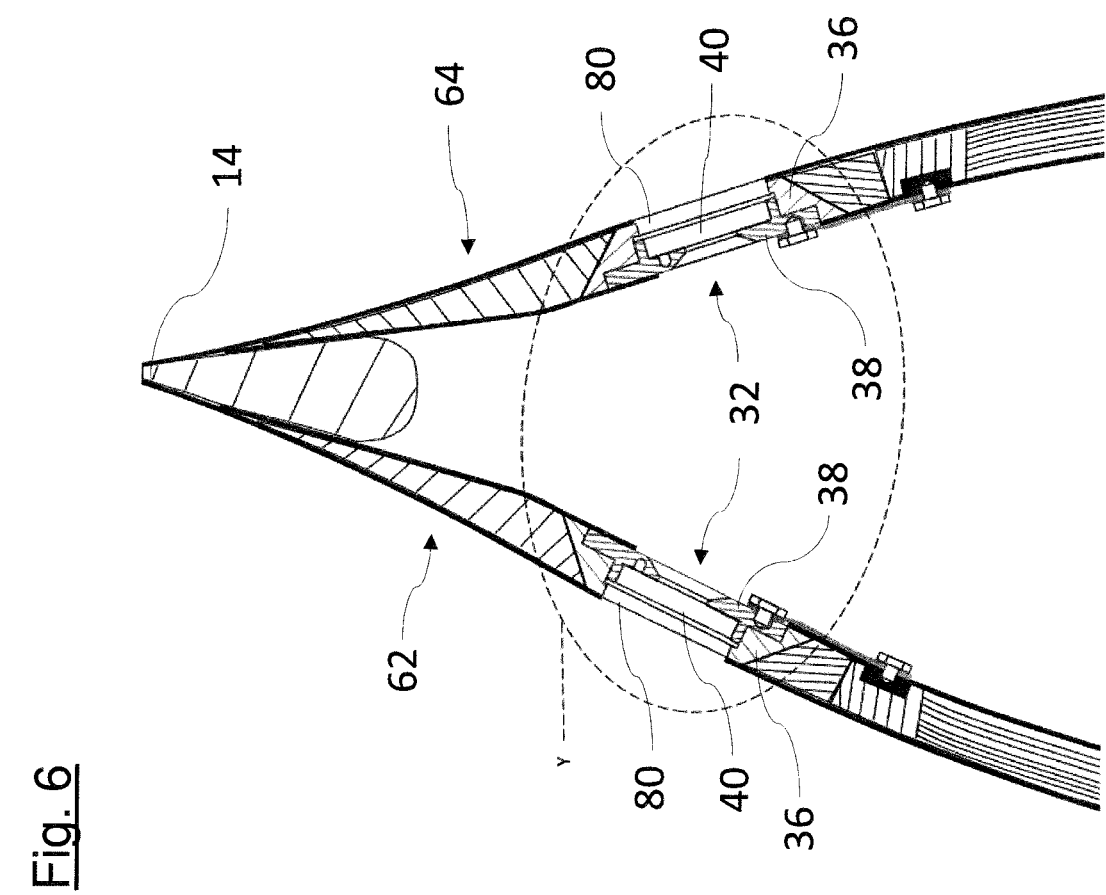
FIG. 5 shows the arrangement from FIG. 4 once joined together with a further half shell, also in a schematic cross-sectional representation.

FIG. 1 illustrates the placing of various materials into a manufacturing mold 10 during the production of a half shell for a wind turbine rotor blade. The manufacturing mold 10 is shown in cross section and, between a profile trailing edge 12, shown in the left-hand side in FIG. 1, and a profile leading edge 14, shown on the right in FIG. 1, of a wind turbine rotor blade that is to be produced, includes a curved progression which corresponds to an aerodynamic profile of the wind turbine rotor blade.

A first cover layer 16 produced from reinforcement fibers, for example one or multiple layers of a woven fabric, in particular produced from glass fibers, is situated in the manufacturing mold 10 as the bottommost layer shown in FIG. 1.

Multiple layers of unidirectionally aligned reinforcement fibers, in particular carbon fibers, which extend in the longitudinal direction of the rotor blade and form a main spar cap 18, are arranged roughly midway between the profile trailing edge 12 and the profile leading edge 14. Following the reinforcement fibers of the main spar cap 18 toward the profile leading edge 14 is a first leading-edge-side insert 20 and a second leading-edge-side insert 22. Both of these are made of a core material, for example of a foamed plastics material.

Following the reinforcement fibers of the main spar cap 18 toward the profile trailing edge 12 is a first trailing-edge-side insert 24 and a second trailing-edge-side insert 26. A lightning conductor 28, the top side of which closes off roughly flush with a top side of the first trailing-edge-side insert 24, is arranged in a recess, which is rectangular in cross section, of the first trailing-edge-side insert 24.

The second trailing-edge-side insert 26 includes a recess 30 which extends over the entire thickness of the second trailing-edge-side insert 26. The recess 30 borders on the first cover layer 16 and, in the example shown, includes a rotationally symmetrical, conical shape. In a view from above into the manufacturing mold 10, which is not shown, the recess 30 appears circular.

FIG. 2 shows how a connection and fastening unit 32 is inserted into the recess 30 of the second trailing-edge-side insert 26. The connection and fastening unit 32 is disk-shaped overall with a circumferential, conical circumferential surface 34. The connection and fastening unit 32 is formed in a manner that is complementary to the recess 30 in the second trailing-edge-side insert 26.

The connection and fastening unit 32 includes a base body 36 produced from an electrically insulating material, for example from a fiber-reinforced plastics material, and a connection body 38. The base body 36 forms the conical circumferential surface 34 and additionally includes a circular, substantially planar surface 44, which faces an outside surface of the wind turbine rotor blade to be produced and, once the connection and fastening unit 32 has been inserted into the recess 30, borders on the first cover layer 16.

The connection body 38 is made of an electrically conducting material, for example copper, aluminum or stainless steel, and is realized in a substantially rotationally symmetrical manner. In its center, the connection body 38 includes a through opening 46 (see FIG. 4) which is closed by a blind plug 42. As a result, the cavity 40 realized between the base body 36 and the connection body 38 is closed in an air-tight manner.

Once the connection and fastening unit 32 has been inserted into the recess 30, the entire arrangement that is situated in the manufacturing mold 10 is covered with a second cover layer 48 produced from reinforcement fibers (see FIG. 3). The reinforcement fibers of the second cover layer 48 can be placed into the manufacturing mold 10 in particular in the form of one layer or multiple layers of a non-woven fabric, for example produced from glass fibers. The connection and fastening unit 32 is embedded between the first cover layer 16 and the second cover layer 48 and there assumes the function of a core material.

A liquid plastics material is then brought into the manufacturing mold 10, in particular in a vacuum infusion process. All the elements situated in the manufacturing mold 10 (as shown in FIG. 3) are embedded into a plastics material matrix as a result. Spaces between the elements situated in the manufacturing mold 10, in particular between the various layers produced from reinforcement fibers, the various inserts 20 to 26 and the connection and fastening unit 32, are filled out with the plastics material and, as a result, are bonded permanently to one another. On account of the air-tight closure of the cavity 40, however, no plastics material passes into the connection and fastening unit 32. Once the plastics material has been brought in, it hardens in the manufacturing mold 10, as a result of which the half shell 62 is substantially finished.

FIG. 4 shows a detail from FIG. 3, in which the connection and fastening unit 32 is arranged. Once the plastics material has hardened, the second cover layer 48 has been removed in part in the region of the connection and fastening unit 32, in particular above a through opening 46 that is realized in the connection body 38. The blind plug 42, by way of which the cavity 40 inside the connection and fastening unit 32 and the through opening 46 have been closed in an air-tight manner whilst the liquid plastics material was brought in and hardened, has also been removed once the second cover layer 48 has been removed.

It can be seen from FIG. 4 that the connection body 38 includes a disk-shaped base plate, in the middle of which the through opening 46 is realized. A top side of the base plate faces the second cover layer 48, and also an interior of the wind turbine rotor blade to be formed. The disk-shaped base plate merges on its bottom side into a tubular portion 50, on the inside of which an internal thread 52 is realized.

The internal thread 52 forms the first connector of the connection and fastening unit 32. The internal thread 52 is at a distance from a wall 82 of the base body 36 which conceals the internal thread 52. The distance extends with reference to the internal thread 52 in the axial direction, in the direction toward the first cover layer 16. There is also a distance outward in the radial direction between the free end of the internal thread 52 and the base body 36.

The connection and fastening unit 32 also includes a second connector in the form of a threaded bore 54 on the top side of the disk-shaped base plate of the connection body 38. The second connector serves for electrical connection to the lightning conductor 28. FIG. 4 shows to this end that a strip-shaped connecting conductor 56 is screw-connected, on the one hand, to the connection body 38 and, on the other hand, to the lightning conductor 28 with in each case a threaded bolt 58.

The connection and fastening unit 32 also includes a third connector in the form of a further threaded bore 60, which is arranged inside the tubular portion 50 in an outside surface of the disk-shaped base plate of the connection body 38 that faces the first cover layer 16, adjacent to the through opening 46. All the production steps explained up to now, up to the state shown in FIG. 4, can be carried out inside the manufacturing mold 10.

The half shell produced in the manufacturing mold 10 is then joined with a further half shell 64, as shown in detail in the cross section in FIG. 5. The joining is effected as a result of bonding the two half shells 62, 64, among other things as shown in FIG. 5 in the region of the profile trailing edges 14.

The further half shell 64 corresponds as regards its configuration to the half shell 62, the production of which has been explained by way of FIGS. 1 to 4, and also includes a connection and fastening unit 32 and lightning conductor 28 connected thereto. It can be seen that the two connection and fastening units 32 are arranged situated opposite one another.

Figure 6:
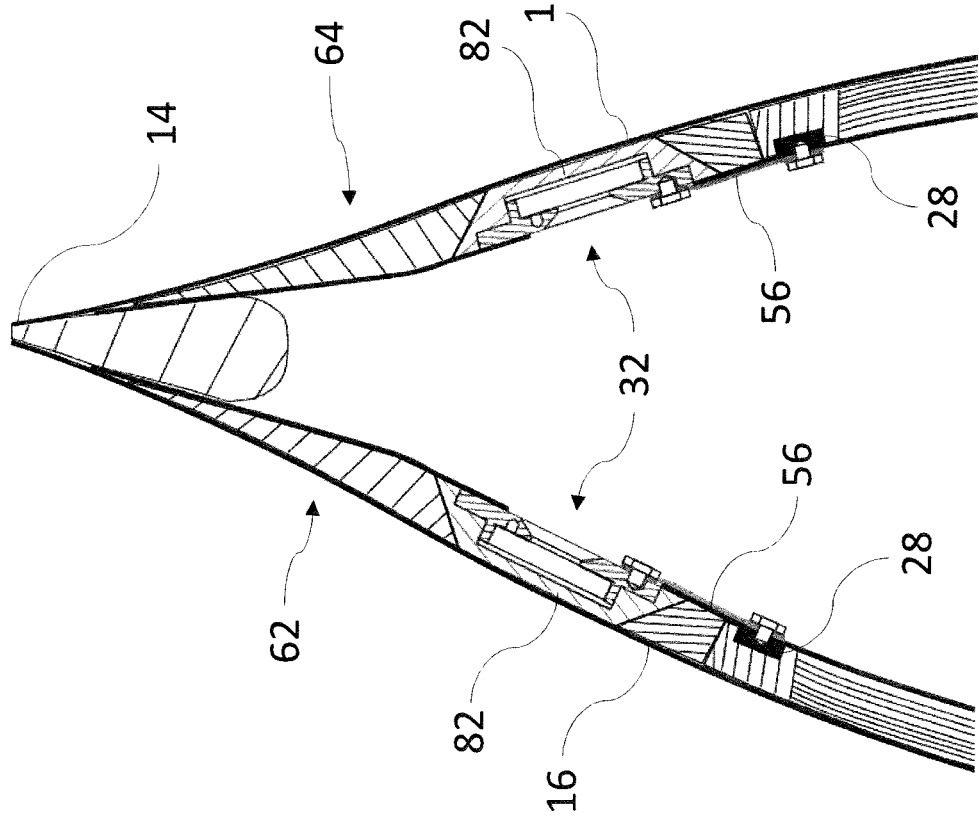
FIG. 6 shows the arrangement from FIG. 5 once the cavities in the two included connection and fastening units have been opened, also in a schematic cross-sectional representation.

FIG. 6 shows the arrangement from FIG. 5 once the two cavities 40 of the connection and fastening units 32 have been opened, in each case from an outside surface of the wind turbine rotor blade that includes joined half shells 62, 64. To this end, in each case from the outside surface, a bore 80 has been realized through the first cover layer 16 and a wall 82, which forms the circular surface 44 of the respectively bordering base body 36, with a diameter which corresponds to a mean diameter of the tubular portion 50 of the connection body 38.

In order to carry out the bore 80 at the desired point, the connection and fastening units 32 can be easily located from the outside of the rotor blade because the connection body 38 or the end faces of the tubular portions 50 thereof and/or the cavities 40 arranged inside thereof and/or the through openings 46 are visible from the outside.

FIG. 6 shows the arrangement from FIG. 4 once the two bores 80 have been produced. The first connector in the form of the internal thread 52 is now exposed and is accessible from the outside of the rotor blade. In addition, there is now also an access option into the interior of the rotor blade from the outside of the rotor blade through the through openings 46.

FIG. 7 shows the two connection and fastening units 32, which are connected in each case via a connecting conductor 56 to a lightning conductor 28 which is arranged in the relevant half shell 62, 64 and is not shown in FIG. 7. In addition, FIG. 7 shows an electric line 66 which is inserted into the arrangement in FIG. 6, that is, once the two half shells 62, 64 have been joined together, into the wind turbine rotor blade and produces an equipotential bonding connection between the two connection and fastening units 32 and the lightning conductors 28 connected thereto.

The electric line 66 is dimensioned such that it extends between the two connection and fastening units 32 through the interior of the rotor blade in a direct line such that it does not require any separate fastening. At its two ends, the electric line 66 includes connection pieces 68 which each include an internal thread. The connection pieces 68 are arranged inside the through openings 46 of the connection body 38. A disk 70, which is produced from metal and includes an opening, through which a threaded bolt 72 is guided and is screwed into an internal thread of a connection piece 68, is arranged on each of the end faces of the connection pieces 68. The disks 70, in turn, abut, where applicable with the addition of one or multiple spacers 74, against an inside of a disk-shaped base plate of a connection body 38 and are screw-connected to the connection body via the further threaded bore 60 (see FIG. 4) which forms a third connector. The disks 70 together with the spacers 74 are each arranged inside a cavity 40 of a connection and fastening unit 32.

FIG. 8 shows the arrangement from FIG. 7 once a lightning receptor 76 has been screwed into each of the connection and fastening units 32. Each lightning receptor 76 includes a circular disk-shaped plate with a conical edge and a tubular portion 78 which is arranged concentrically to the inside thereof and includes an external thread which is screwed into an internal thread 52 of a tubular portion 50 of a connection body 38. In this case, the end face of the tubular portion 78 of each lightning receptor 76 abuts against the disk-shaped base plate of a connection body 38 which forms a stop 90 and determines the relative position of the lightning receptor 76 with respect to the connection and fastening unit 32. The stop 90 is arranged such that the circular disk-shaped plates of the lightning receptors 76 abut substantially against one of the first cover layers 16 of the relevant half shell 62, 64 or it is possible to seal a small joint created there in a simple manner.

It is understood that the foregoing description is that of the preferred embodiments of the invention and that various changes and modifications may be made thereto without departing from the spirit and scope of the invention as defined in the appended claims.

LIST OF REFERENCE SIGNS USED

10 Manufacturing mold
12 Profile trailing edge
14 Profile leading edge
16 First cover layer
18 Main spar cap
20 First leading-edge-side insert
22 Second leading-edge-side insert
24 First trailing-edge-side insert
26 Second trailing-edge-side insert
28 Lightning conductor
30 Recess
32 Connection and fastening unit
34 Conical circumferential surface
36 Base body
38 Connection body
40 Cavity
42 Blind plug
44 Circular surface
46 Through opening
48 Second cover layer
50 Tubular portion
52 Internal thread
54 Threaded bore
56 Connection conductor
58 Threaded bolt
60 Further threaded bore
62 Half shell
64 Further half shell
66 Electric line
68 Connection piece
70 Disk
72 Threaded bolt
74 Spacer
76 Lightning receptor
78 Tubular portion
80 Bore
82 Wall

What is claimed is:

1. A connection and fastening unit for components of a lightning protection system, the connection and fastening unit being configured to be integrated in a wind turbine rotor blade and to be connected to the components of the lightning protection system, the connection and fastening unit comprising:
 a connection and fastening body defining a cavity configured to be closeable in an airtight manner;
 at least one connector configured to connect to at least one of the components of the lightning protection system;
 said at least one connector being arranged in said cavity;
 said connection and fastening body including a base body produced from an electrically insulating material and a connection body produced from an electrically conducting material;
 said base body and said connection body being fixedly interconnected;
 said cavity being arranged between said base body and said connection body;
 said at least one connector including a first connector having an inner thread in said connection body; and,
 wherein said connection body has a bottom side configured to face away from an interior of the wind turbine rotor blade and a tubular portion at said bottom side; and, said inner thread is formed on an interior side of said tubular portion.

2. The connection and fastening unit of claim 1, wherein the connection and fastening unit defines an installation position; said base body being configured to face an outside surface of the wind turbine rotor blade when the connection and fastening unit is in said installation position in the wind turbine rotor blade; and, said connection body being configured to face an interior of the wind turbine rotor blade when the connection and fastening unit is in said installation position in the wind turbine rotor blade.

3. The connection and fastening unit of claim 1, wherein said base body includes a wall; said inner thread is arranged behind said wall of said base body when viewed from outside; and, said wall of said base body and said connection body conjointly define a gap therebetween in the region of said inner thread.

4. The connection and fastening unit of claim 3 further comprising:
 a lightning receptor configured to connect to said first connector and defining a first outer diameter;
 said connection body defining a second outer diameter; and,
 said first outer diameter being larger than said second outer diameter of said connection body.

5. The connection and fastening unit of claim 4 further comprising:
 a stop; and,
 said lightning receptor being configured to rest against said stop when said lightning receptor is connected to said connection body.

6. The connection and fastening unit of claim 1, wherein said base body defines a pass-through opening configured to be sealed in an air-tight manner via a blind plug.

7. The connection and fastening unit of claim 1, wherein said at least one connector further includes a second connector; said second connector has a bore with an inner thread; said connection body includes a surface directed into said cavity; and, said bore is arranged in said surface.

8. The connection and fastening unit of claim 1, wherein said connection body has a surface directed into an interior of the wind turbine rotor blade; and, said at least one connector includes a third connector which is arranged on said surface of said connection body and includes a bore with an internal thread.

9. The connection and fastening unit of claim 1, wherein said inner thread is configured to engage an external thread of a lightning receptor.

10. A wind turbine rotor blade comprising:
 at least one component of a lightning protection system;
 a connection and fastening unit defining a cavity configured to be closable in an airtight manner;

said connection and fastening unit including at least one connector connected to said at least one component of the lightning protection system;

said at least one connector being arranged in said cavity;

said connection and fastening unit being integrated into the wind turbine rotor blade;

said connection and fastening unit including a base body produced from an electrically insulating material and a connection body produced from an electrically conducting material;

said base body and said connection body being fixedly interconnected;

said cavity being arranged between said base body and said connection body; and, said at least one connector including a first connector having an inner thread in the connection body, wherein said connection body has a bottom side configured to face away from an interior of the wind turbine rotor blade and a tubular portion at said bottom side; and, said inner thread is formed on an interior side of said tubular portion.

11. A method for mounting components of a lightning protection system on a wind turbine rotor blade, the method comprising the steps of:

integrating a connection and fastening unit into the wind turbine rotor blade, the connection and fastening unit having a cavity which can be closed in an airtight manner and in which a connector for connection to at least one of the components of the lightning protection system is arranged;

opening the cavity before connecting the connector to the at least one component of the lightning protection system; and, connecting the connector to the at least one component of the lightning protection system;

wherein the connection and fastening unit includes a base body produced from an electrically insulating material and a connection body produced from an electrically conducting material, the base body and the connection body are fixedly interconnected, and, the cavity is arranged between the base body and the connection body, wherein the connector includes a first connector having an inner thread in the connection body, wherein said connection body has a bottom side configured to face away from an interior of the wind turbine rotor blade and a tubular portion at said bottom side; and, said inner thread is formed on an interior side of said tubular portion.

12. The method of claim 11, wherein the at least one of the components of the lightning protection system is a lightning receptor.

13. The method of claim 11 further comprising the step of connecting a lightning protector conductor to the connection and fastening unit.

14. The method of claim 13, wherein the wind turbine rotor blade includes two half shells, the method further comprising:

joining the two half shells;

the connection and fastening unit being integrated into one of said two half shells;

said connecting of the connection and fastening unit to the lightning protector conductor takes place prior to said joining the two half shells; and, said connecting of the connector to the at least one component of the lightning protection system takes place after said joining the two half shells.

15. The method of claim 14 further comprising the steps of:

integrating a further connection and fastening unit into the other one of the two half shells, the further connection and fastening unit defining a further cavity which can be closed in an air tight manner and in which a further connector for connection to at least one of the components of the lightning protection system is arranged;

inserting an electrical line into the wind turbine rotor blade; and, electrically connecting the electrical line to the further connector of the further connection and fastening unit and the connector of the connection and fastening unit.

16. The method of claim 11, wherein the wind turbine rotor blade has a wall of a sandwich construction including a first cover layer and a second cover layer; the connection and fastening unit is integrated into the wall; and, the connection and fastening unit is arranged between said first cover layer and said second cover layer when making the wall.

* * * * *